(12) United States Patent
Mochizuki (10) Patent No.: US 9,574,913 B2
(45) Date of Patent: Feb. 21, 2017

(54) DIAL PLATE STRUCTURE AND AUTOMOTIVE METER

(71) Applicant: YAZAKI CORPORATION, Minato-ku, Tokyo (JP)

(72) Inventor: Yasufumi Mochizuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 86 days.

(21) Appl. No.: 14/506,215

(22) Filed: Oct. 3, 2014

(65) Prior Publication Data

US 2015/0096487 A1    Apr. 9, 2015

(30) Foreign Application Priority Data

Oct. 4, 2013  (JP) .................................. 2013-209321

(51) Int. Cl.
*G01D 13/20* (2006.01)
*G01D 13/18* (2006.01)
*G01D 7/04* (2006.01)

(52) U.S. Cl.
CPC .............. *G01D 13/20* (2013.01); *G01D 13/18* (2013.01); *G01D 7/04* (2013.01)

(58) Field of Classification Search
CPC ........ G01D 11/28; G01D 13/02; G01D 13/04; G01D 13/12; G01D 13/18; G01D 13/20
USPC   116/86, 287, 334, 335, DIG. 36; 362/23.01, 23.12, 12.13, 23.19, 23.2, 23.21
See application file for complete search history.

(56) References Cited

U.S. PATENT DOCUMENTS

| | | | | |
|---|---|---|---|---|
| 6,802,276 B2* | 10/2004 | Sugimoto | ............. | B60K 37/02 116/286 |
| 8,562,196 B2* | 10/2013 | Lust et al. | ............. | C23C 14/20 362/23.05 |
| 2009/0091912 A1* | 4/2009 | Lee | ..................... | G02B 6/0038 362/23.19 |
| 2016/0091346 A1* | 3/2016 | Otani et al. | ............ | G01D 11/28 362/23.16 |

FOREIGN PATENT DOCUMENTS

| | | | | |
|---|---|---|---|---|
| JP | 2003-106873 A | | 4/2003 | |
| JP | 2007232739 A | * | 9/2007 | ............. G01D 13/02 |
| JP | 2009128244 A | * | 6/2009 | ............. G01D 13/04 |

* cited by examiner

*Primary Examiner* — R. A. Smith
(74) *Attorney, Agent, or Firm* — Sughrue Mion, PLLC (57) ABSTRACT

A dial plate structure of a vehicular combination meter includes a dial plate; a light guide disposed back side of the dial plate, the light guide receiving light from a three-dimensional scale light source incident upon a proximal end side thereof; three-dimensional scale marks protruding and disposed on a distal end side of the light guide, the three-dimensional scale marks protruding from through holes perforated in the dial plate; a dimming white print formed on the back surface of the dial plate; and a hard coat clear print formed on the back surface of the dial plate so as to cover at least portions of the dimming white print opposed to the three-dimensional scale marks.

7 Claims, 6 Drawing Sheets

DIAL PLATE STRUCTURE AND AUTOMOTIVE METER

CROSS-REFERENCE TO RELATED APPLICATIONS

The present application claims priority to and incorporates by reference the entire contents of Japanese Patent Application No. 2013-209321 filed in Japan on Oct. 4, 2013.

BACKGROUND OF THE INVENTION

1. Field of the Invention

The present invention relates to a dial plate structure and an automotive meter.

2. Description of the Related Art

Dial plates for automotive meters include an index portion and a ground color portion that forms a background for the index portion. The index portion and the ground color portion are generally formed through printing on a substrate, so that the dial plate is viewed planarly.

A known technique that causes the dial plate to be viewed three-dimensionally uses a previously printed flat substrate that is deformed by protruding molding or drawing to thereby form an inclined surface or irregularities on the dial plate. This technique allows the dial plate surface to have a three-dimensional look.

The technique is not, however, suitable for three-dimensionally molding only a limited area on which the index portion is formed and, unfortunately, is not capable of molding the index portion into a sharp form, as noted by the substrate being rounded for curvature of the wall thickness thereof.

A dial plate structure has been developed that further enhances design appearance of an automotive meter. The dial plate structure includes a three-dimensional scale disposed on an illuminating light guide member disposed beneath a dial plate. The three-dimensional scale protrudes from a through hole open at a corresponding portion in the dial plate, thus constituting a three-dimensional scale structure (see Japanese Patent Application Laid-open No. 2003-106873).

Figure 6A:
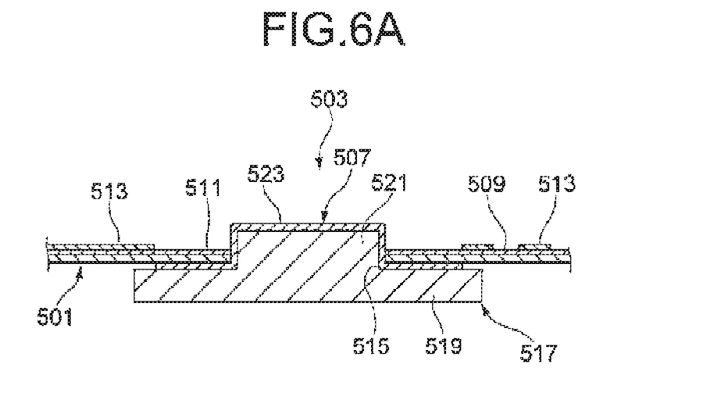
FIG. 6A is a cross-sectional view of a related-art index portion.
Figure 6B:
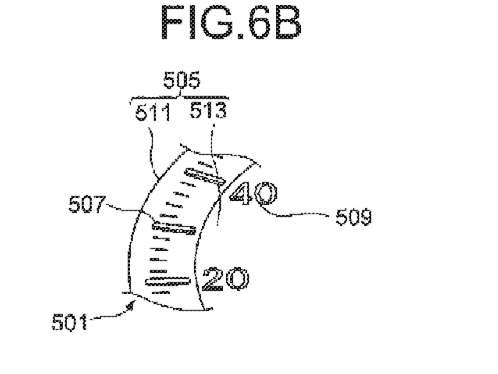
FIG. 6B is a perspective view of a main portion of an indicating plate illustrated in FIG. 6A.
Figure 6C:
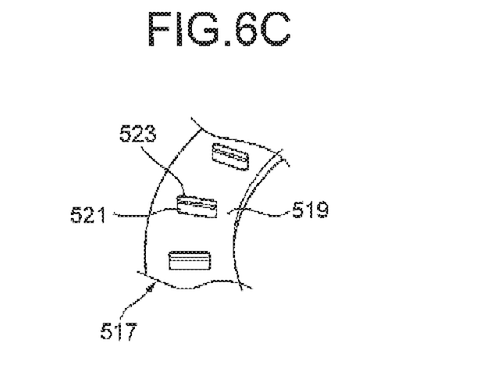
FIG. 6C is a perspective view of a main portion of an indicating member illustrated in FIG. 6A.

The pointer instrument disclosed in Japanese Patent Application Laid-open No. 2003-106873 includes, as illustrated in FIGS. 6A to 6C, a pointer and an indicating plate (dial plate) 501 to be indicated by the pointer. The indicating plate 501 is disposed to have a circularly arcuate arrangement format along the rotational path of the pointer. The indicating plate 501 includes an index portion 503 to be pointed by the pointer and a ground color portion 505 that assumes a background for the index portion 503. The index portion 503 includes scale portions 507 and indicia portions 509 associated with the scale portions 507.

The ground color portion 505 includes a first ground color portion 511 and a second ground color portion 513. The first ground color portion 511 is formed into a band shape along the scale portions 507 to thereby form a background for the scale portions 507. The second ground color portion 513 is formed around the first ground color portion 511, part of the second ground color portion 513 forming a background for the indicia portions 509.

The indicating plate 501 has openings (through holes) 515 that correspond to the scale portions 507. An indicating member (light guide) 517 is disposed at the back of the indicating plate 501. The indicating member 517 includes a base portion 519 that extends in a band shape along a back surface of the indicating plate 501 and protruding portions 521 that protrude toward the side of the indicating plate from the base portion 519 (see FIG. 6C). The protruding portions 521 protrude on the indicating plate from the openings 515 to thereby form part of the scale portions 507. The protruding portions 521 are provided in plurality, each having an outline shape corresponding to the internal shape of the corresponding opening 515 in the indicating plate 501. A coloring layer 523 is formed on the surface of each of the protruding portions 521.

The foregoing arrangements result in the protruding portions 521, each having a three-dimensional structure protruding on the indicating plate, being visually recognized as a three-dimensional scale corresponding to the scale portions 507 of the indicating plate 501.

Figure 7:
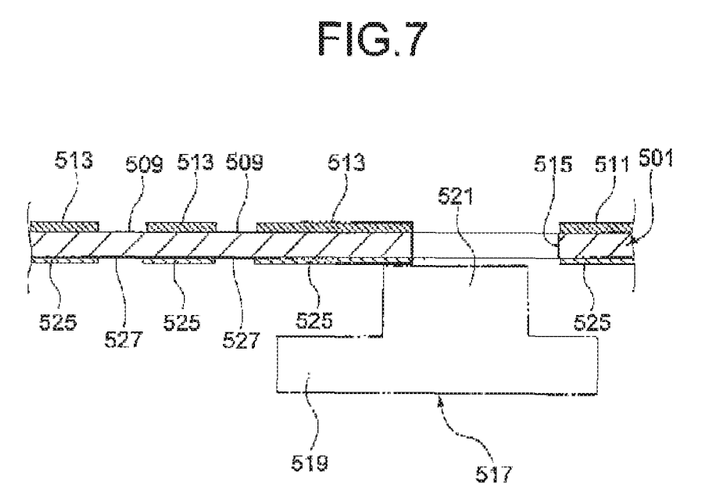
FIG. 7 is a cross-sectional view of a related-art dial plate having a print layer disposed on a back side thereof.

The above-described dial plate structure that includes the index portion 503 in the openings 515 formed at a corresponding portion of the indicating plate 501 is, however, very often provided with a dial plate back surface print (print layer) 525, such as a design print and a dimming print, on the back surface of the indicating plate 501, as illustrated in FIG. 7. It is noted that a print void portion 527 of, for example, a numeral may be formed according to the indicia portions 509 for the dial plate back surface print 525. Such a dial plate back surface print 525 is generally soft. If the protruding portions 521 have an angular shape, therefore, the dial plate back surface print 525 may be damaged when the indicating member 517 is mounted on the back of the indicating plate 501 to thereby cause the protruding portions 521 to protrude on the indicating plate through the openings 515. It is difficult to simultaneously fit the protruding portions 521 into the respective openings 515. Meanwhile, use of an assembly jig, for example, can minimize damage, but results in reduced workability and increased manufacturing cost.

SUMMARY OF THE INVENTION

The present invention has been made considering the above circumstances, and an object thereof is to provide a dial plate structure and an automotive meter that can prevent a print on a back surface of a dial plate from being damaged without involving increased manufacturing cost, even with a three-dimensional design portion protruding from through holes in the dial plate.

It is an object of the present invention to at least partially solve the problems in the conventional technology.

The object of the present invention can be achieved by the following configurations.

According to one aspect of the present invention, a dial plate structure includes a dial plate; a light guide disposed back side of the dial plate, the light guide receiving light from a light source incident upon a proximal end side thereof; a three-dimensional design portion protruding and disposed on a distal end side of the light guide, the three-dimensional design portion protruding from a through hole perforated in the dial plate; a print layer formed on the back surface of the dial plate; and a transparent protective layer formed on the back surface of the dial plate so as to cover at least a portion of the print layer opposed to the three-dimensional design portion.

According to another aspect of the present invention, the transparent protective layer is disposed also on an area corresponding to a design portion formed on the dial plate.

According to still another aspect of the present invention, an automotive meter includes the dial plate structure described above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The present invention has been briefly described. A more complete understanding of the present invention will be readily obtained by reference to the following detailed description of a mode for carrying out the invention (hereinafter referred to as an "embodiment") when considered in conjunction with the accompanying drawing.

An embodiment of the present invention will be described below with reference to the accompanying drawings.

Figure 2:
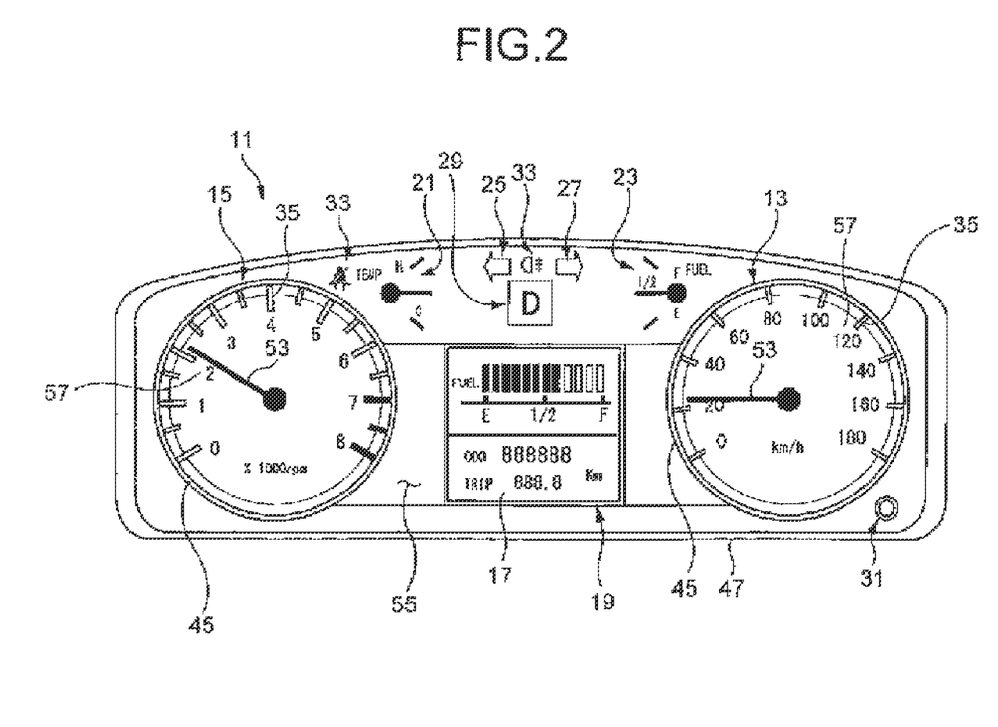
FIG. 2 is a front elevational view of an automotive meter that incorporates the dial plate illustrated in FIG. 1.

A dial plate structure according to the embodiment of the present invention can be applied, for example, to a vehicular combination meter (automotive meter) 11 illustrated in FIG. 2.

The vehicular combination meter 11 is mounted on, for example, an instrument panel (not illustrated) of a vehicle. As illustrated in FIG. 2, the vehicular combination meter 11 includes a speedometer 13, a tachometer 15, a multi-display unit 19, a water temperature gauge 21, a fuel gauge 23, a turn-L indicator 25, a turn-R indicator 27, a shift indicator 29, a trip knob 31, and a warning lamp 33. Specifically, the speedometer 13 is an automotive meter that indicates the speed of the vehicle. The tachometer 15 is another automotive meter that indicates the rotational speed of an engine. The multi-display unit 19 is a liquid crystal display incorporating a liquid crystal plate (LCD) 17. The water temperature gauge 21 indicates an engine coolant temperature. The warning lamp 33 warns that any of the seat belts is not being worn or the headlamps remain switched on. A speedometer dial plate and a tachometer dial plate each include three-dimensional scale marks 35 as a three-dimensional design portion disposed on a circumferential edge thereof. In the embodiment, the speedometer 13 will be exemplarily described.

The speedometer 13, the tachometer 15, the multi-display unit 19, the water temperature gauge 21, the fuel gauge 23, the turn-L indicator 25, the turn-R indicator 27, the shift indicator 29, the trip knob 31, electronic components 37, an internal mechanism 39 including pointer movements, and a wiring substrate 41 on which the internal mechanism 39 and other parts are mounted (illustrated in FIG. 3) are all housed in a meter case 43 molded using a synthetic resin. The speedometer 13 and the tachometer 15 each have an ornamental ring 45 fitted on an outer circumference thereof. A bezel 47 (see FIG. 2) is attached to the front surface of the meter case 43. The bezel 47 hides the internal mechanism 39, the wiring substrate 41, and other parts housed in the meter case 43.

A front cover (not illustrated) is attached to the meter case 43 on the front surface side of the bezel 47. The front cover is formed of a translucent material such as a colorless, transparent acrylic resin. The front cover has a front surface on which a reflection preventive film that prevents extraneous light or the like from being reflected.

The meter case 43 that houses therein the wiring substrate 41 has a back surface closed by a back cover 49. The back cover 49, while housing therein the wiring substrate 41 held by the meter case 43, prevents the wiring substrate 41 from being contaminated with dust and dirt that come from the rear in the display direction.

Figure 4:
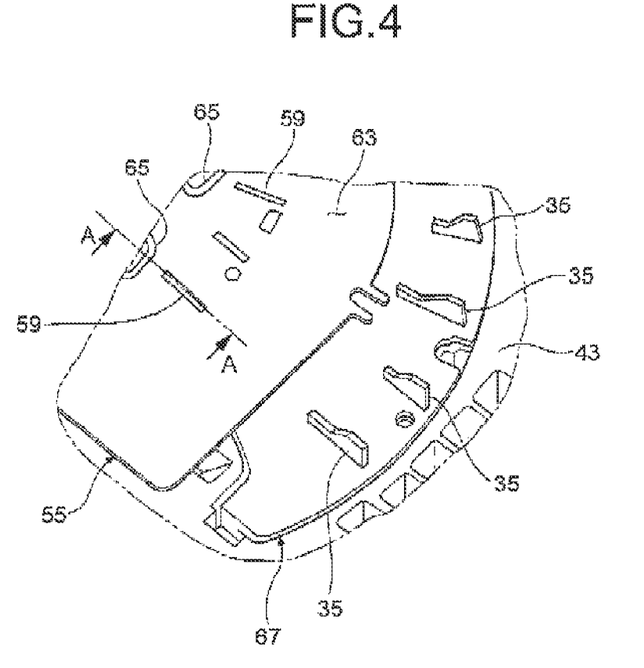
FIG. 4 is an exploded perspective view of a light guide and the dial plate illustrated in FIG. 3.

The speedometer 13 operates as follows. A motor housed inside the internal mechanism 39 rotates a predetermined amount according to a measured value taken by a rotational sensor (not illustrated). A pointer 53 connected to a drive shaft 51 of the motor rotates over the dial plate. This results in numerals 57 formed on a dial plate 55 or the three-dimensional scale marks 35 that protrude from through holes 59 in the dial plate 55 illustrated in FIG. 4 being indicated.

The pointer 53 has a lower surface on which a red hot stamp layer, for example, is formed. The pointer 53 has a pointer shaft 61 connected to the drive shaft 51. The drive shaft 51 is formed of a transparent resin such as polycarbonate and passes through, and is supported rotatably by, the internal mechanism 39. A pointer light source (not illustrated) is disposed to face a lower end of the drive shaft 51. Light from the pointer light source entering the pointer shaft 61 via the drive shaft 51 is propagated to the pointer 53, so that the pointer 53 can be visually recognized as light colored by the hot stamp layer.

Figure 5:
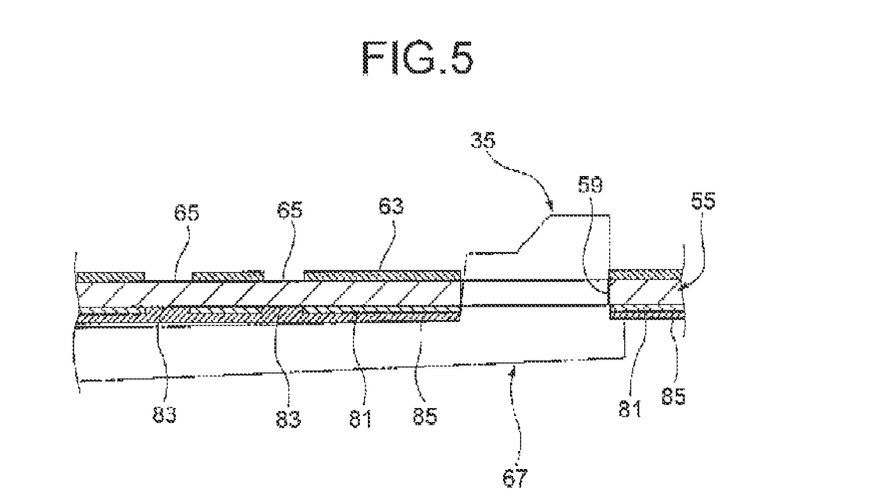
FIG. 5 is a cross-sectional view taken along line A-A of FIG. 4.

A substrate of the dial plate 55 is a transparent resin. As illustrated in FIG. 5, a light-blocking black print 63 is disposed on the surface of the dial plate 55. Black print void portions 65 that represent a black print 63 removed according to the numerals 57 are formed on the black print 63 disposed on the surface of the dial plate 55. The black print void portions 65 allow light propagating in the dial plate 55 to exit, thereby forming a light emitting surface having shapes of numerals on the surface of the dial plate 55.

Figure 3:
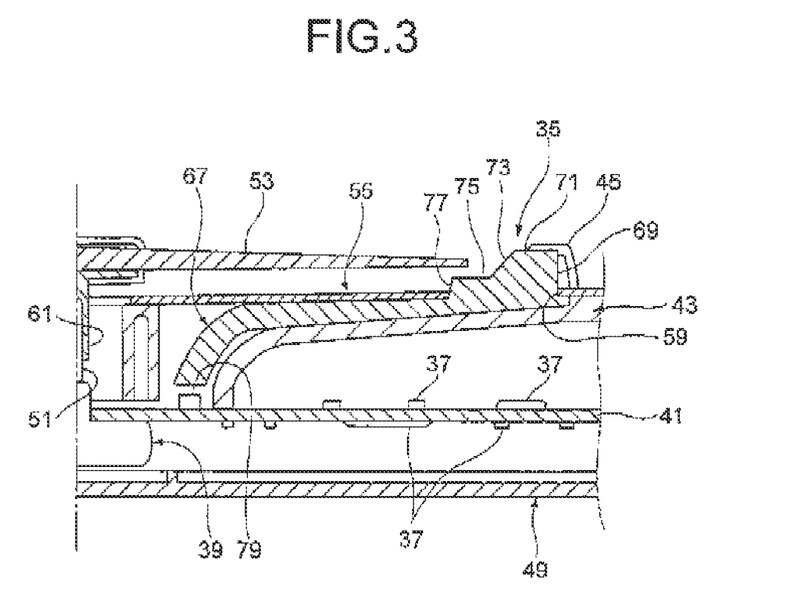
FIG. 3 is a cross-sectional view taken along a pointer illustrated in FIG. 2 in a direction perpendicular to the dial plate.

As illustrated in FIG. 3, a light guide 67 is disposed on the back side of the dial plate 55. The light guide 67 is integrally formed of a transparent resin. Three-dimensional scale marks 35 are provided in plurality protruding on a light guide surface of the light guide 67. The light guide 67 is mounted on the dial plate 55 such that the three-dimensional scale marks 35 fit in the through holes 59 in the dial plate 55 from the back surface of the dial plate 55. This results in the three-dimensional scale marks 35 protruding to the front surface side of the dial plate 55 through the through holes 59, thus forming a scale corresponding to the numerals 57 of the dial plate 55. The dial plate 55, having the three-dimensional scale marks 35 having a three-dimensional structure that protrudes to the front surface side as described above, can produce a three-dimensional effect, so that favorable visibility can be achieved.

The three-dimensional scale marks 35 are formed into standing pieces having substantially a trapezoidal shape. Each of the three-dimensional scale marks 35 has a standing long edge 69 that stands upright from the light guide 67, a horizontal edge 71, an inclined edge 73, a lower horizontal edge 75, and a standing inclined short edge 77, to thereby have a shouldered trapezoidal outline in a side view. Of these edges, the inclined edge 73 constitutes a main scale surface. The three-dimensional scale marks 35 are formed such that boundaries between the edges are formed to be angular to ensure favorable visibility during light guiding.

A three-dimensional scale light source 79 that causes light to enter the three-dimensional scale marks 35 is disposed on the back side of the light guide 67. The three-dimensional scale light source 79 is mounted on the wiring substrate 41 supported by the meter case 43. The three-dimensional scale light source 79 is a light emitting diode (LED) that emits light toward a proximal end side of the light guide 67.

Light from the three-dimensional scale light source 79 enters the proximal end side of the light guide 67. The light that enters the proximal end side of, and propagates through, the light guide 67 exits from the three-dimensional scale marks 35 provided protruding on a distal end side of the light guide 67 and protruding from the through holes 59 in the dial plate 55. Light emitted from the surface of the inclined edge 73 of each three-dimensional scale mark 35 is mainly visually recognized.

As illustrated in FIG. 5, a dimming white print 81 as a print layer is disposed on the back surface of the dial plate 55. The dimming white print 81 colors light propagating in the dial plate 55 white. This causes the numerals 57 on the dial plate 55 to be visually recognized as white light that transmits the black print void portions 65 outlined to have a desired shape. White print void portions 83 that represent the dimming white print 81 removed according to the numerals 57 are formed in the dimming white print 81 formed on the back side of the dial plate 55. The white print void portions 83 allow light emitted from a design portion light source (not illustrated) disposed below the back surface of the dial plate 55 to be incident thereupon, thereby allowing the incident light to travel to the black print void portions 65.

Figure 1:
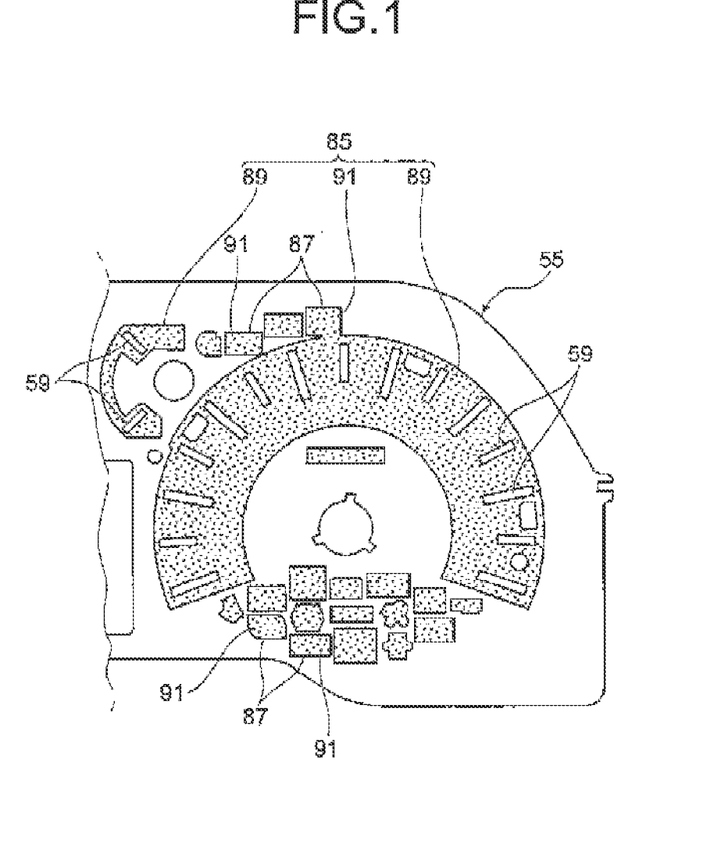
FIG. 1 is a rear elevational view of a dial plate that has a dial plate structure according to an embodiment of the present invention.

As illustrated in FIG. 5, a hard coat clear print 85 as a transparent protective layer is formed on the back surface of the dial plate 55. The hard coat clear print 85 is filled in the white print void portions 83 to thereby provide a covering for the front surface of the dimming white print 81. Referring to FIG. 1, the hard coat clear print 85 is formed so as to cover at least portions of the dimming white print 81 that are opposed to the three-dimensional scale marks 35.

In the embodiment, the hard coat clear print 85 is provided also on areas corresponding to warning portions 87 formed as design portions on the dial plate 55. Specifically, for the hard coat clear print 85, both hard coat clear portions 89 for protection of the print layer and warning portion hard coat clear portions 91 as a dimming functional layer for, for example, light diffusion are simultaneously formed. The hard coat clear print 85 including these portions is formed by, for example, screen printing with a transparent print paint.

The hard coat clear print 85, which is harder and tougher than ordinary color prints, prevents the dimming white print 81 from being damaged during the mounting of the dial plate 55. The warning portion hard coat clear portions 91 of the hard coat clear print 85 formed on the back surface of the dial plate 55 according to the warning portions 87 are used for light diffusion of the warning portions 87. The light diffusion offered by the warning portion hard coat clear portions 91 of the hard coat clear print 85 minimizes uneven illumination in the warning portions 87.

The following describes effects achieved by the dial plate structure having the configuration described above.

In the dial plate structure according to the embodiment, the hard coat clear print 85 is formed on portions that are opposed to the three-dimensional scale marks 35 to be inserted in the through holes 59 in the dial plate 55 (portions on the back surface of the dial plate possibly in contact with the three-dimensional scale marks 35 during insertion of the three-dimensional scale marks 35 due to, for example, hand shake). Specifically, the hard coat clear print 85 is attached so as to provide a covering for the front surface of the dimming white print 81 formed on the back surface of the dial plate 55. The hard coat clear print 85 is harder and tougher than ordinary color prints. Thus, should the three-dimensional scale marks 35 contact the back surface of the dial plate during the mounting of the light guide, the hard coat clear print 85 protects the dimming white print 81, preventing the dimming white print 81 from being damaged by edges of the three-dimensional scale marks 35.

In the dial plate structure according to the embodiment, the hard coat clear print 85 is provided also on design portions formed on other portions of the dial plate 55, for example, areas corresponding to the warning portions 87. The warning portion hard coat clear portions 91 of the hard coat clear print 85 provided on the back surface of the dial plate corresponding to the warning portions 87 serve as a dimming functional layer for, for example, light diffusion of the warning portions 87. In such a case, the hard coat clear print 85 is formed not for simply protecting the print layer formed on the back surface of the dial plate. Specifically, the hard coat clear portions 89 of the hard coat clear print 85 can be formed simultaneously with the warning portion hard coat clear portions 91 as the dimming functional layer for the warning portions 87. This prevents an absolute addition of the step for forming the hard coat clear portions 89 and reduces the number of elements contributing to an increase in cost.

The vehicular combination meter 11 in the embodiment including the dial plate structure having the above-described configuration can provide a favorable vehicular combination meter 11 having visibility not degraded by a damaged dimming white print 81 on the back surface of the dial plate 55. For example, when part of the dimming white print is shaved off by an edge of a three-dimensional scale, the dimming effect is partially degraded, resulting in uneven color in the design portion illuminated with white light. In the vehicular combination meter 11 of the embodiment, however, uneven color due to a damaged dimming white print 81 does not occur. This allows the design portion of the dial plate 55 to be irradiated with uniformly dimmed illumination light, which ensures favorable visibility of the dial plate 55.

The present invention is not limited to the embodiment described above by way of example and various changes, improvements, and the like may be made as appropriate. In addition, each of the elements in the above-described embodiment is not limited to that described above in terms of material, shape, dimension, number, placement position, and the like. These elements may be otherwise configured as long as the invention can be achieved.

The following summarizes features of the dial plate structure and the automotive meter according to the embodiment of the present invention described above.

[1] The dial plate structure includes the dial plate 55; the light guide 67 disposed on the back side of the dial plate 55, the light guide 67 receiving light from the light source (three-dimensional scale light source) 79 incident upon the proximal end side thereof; the three-dimensional design portion (three-dimensional scale marks) 35 protruding and disposed on the distal end side of the light guide 67, the three-dimensional design portion (three-dimensional scale marks) 35 protruding from the through holes 59 perforated in the dial plate 55; the print layer (dimming white print) 81 formed on the back surface of the dial plate 55; and the transparent protective layer (hard coat clear print) 85 formed on the back surface of the dial plate so as to cover at least portions of the print layer (dimming white print) 81 opposed to the three-dimensional design portion (three-dimensional scale marks) 35.

In the dial plate structure having the configuration [1] above, the transparent protective layer is formed on portions that are opposed to the three-dimensional design portion to be inserted in the through hole in the dial plate (portions on the back surface of the dial plate possibly in contact with the three-dimensional design portion during insertion of the three-dimensional design portion due to, for example, hand shake). Specifically, the transparent protective layer is attached so as to provide a covering for the front surface of the print layer formed on the back surface of the dial plate. The transparent protective layer is harder and tougher than ordinary color prints. Thus, should the three-dimensional design portion contact the back surface of the dial plate during the mounting of the light guide, the transparent protective layer protects the print layer, preventing the print layer from being damaged by edges of the three-dimensional design portion.

[2] The dial plate structure having the configuration [1] above is characterized in that the transparent protective layer (hard coat clear print) 85 is disposed also on areas corresponding to the design portions (warning portions) 87 formed on the dial plate 55.

In the dial plate structure having the configuration [2] above, the transparent protective layer is provided also on areas corresponding to design portions (for example, warning portions) formed on other portions of the dial plate. The transparent protective layer provided on the back surface of the dial plate corresponding to the design portion serves as a dimming functional layer for, for example, light diffusion of the design portion. In such a case, the transparent protective layer is formed not for simply protecting the print layer formed on the back surface of the dial plate. Specifically, the print layer protective portion of the transparent protective layer can be formed simultaneously with the dimming functional layer for the design portion. This prevents an absolute addition of the step for forming the transparent protective layer and reduces the number of elements contributing to an increase in cost.

[3] The automotive meter (vehicular combination meter) 11 includes the dial plate structure having the configuration [1] or [2] above.

The automotive meter having the configuration [3] above can provide a favorable automotive meter having visibility not degraded by a damaged print layer on the back surface of the dial plate. For example, when the print layer is a dimming white print and part of the dimming white print is shaved off by an edge of the three-dimensional design portion, the dimming effect is partially degraded, resulting in uneven color in the design portion illuminated with white light. In the automotive meter having the configuration [3], however, uneven color due to a damaged dimming white print does not occur. This allows the design portion of the dial plate to be irradiated with uniformly dimmed illumination light, which ensures favorable visibility of the dial plate.

The dial plate structure according to the embodiment, even with the three-dimensional scale marks 35 protruding from the through holes 59 in the dial plate 55, can prevent the print on the back surface of the dial plate from being damaged without involving increased manufacturing cost.

The vehicular combination meter 11 according to the embodiment prevents the print on the back surface of the dial plate from being damaged, so that the visibility of the dial plate 55 is not degraded.

The automotive meter according to the embodiment prevents the print layer on the back surface of the dial plate from being damaged, so that the visibility of the dial plate is not degraded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A dial plate structure comprising:
a dial plate;
a light guide disposed back side of the dial plate, the light guide receiving light from a light source incident upon a proximal end side thereof;
a three-dimensional design portion protruding and disposed on a distal end side of the light guide, the three-dimensional design portion protruding from a through hole perforated in the dial plate;
a print layer formed on the back surface of the dial plate, the print layer coloring light propagating in the dial plate; and
a transparent protective layer formed on the back surface of the dial plate so as to cover at least a portion of the print layer opposed to the three-dimensional design portion.
2. The dial plate structure according to claim 1, wherein the transparent protective layer is disposed also on an area corresponding to a design portion formed on the dial plate.
3. An automotive meter comprising:
the dial plate structure according to claim 2.
4. An automotive meter comprising:
the dial plate structure according to claim 1.
5. The dial plate structure according to claim 1, wherein there is no light blocking print layer located between the light guide and the dial plate.
6. The dial plate structure according to claim 1, further comprising partially transparent print layer void portions on the bottom surface of the dial plate, and wherein the transparent protective layer protrudes into the partially transparent print layer void portions.
7. The dial plate structure according to claim 1, further comprising a light blocking print layer formed on at least one portion of the top surface of the dial plate.

* * * * *